United States Patent [19]

Thrasher

[11] 4,363,527
[45] Dec. 14, 1982

[54] SPLIT RACE BEARING

[76] Inventor: Howard Thrasher, 5430 Crebs, Tarzana, Calif. 91356

[21] Appl. No.: 220,863

[22] Filed: Dec. 29, 1980

[51] Int. Cl.³ ............................................. F16C 27/04
[52] U.S. Cl. ................................. 308/184 R; 308/196
[58] Field of Search ............... 308/184 R, 188, 189 R, 308/189 A, 196, 197, 216, 177; 267/41

[56] References Cited

U.S. PATENT DOCUMENTS 2,650,864  9/1953  Mergen ............................ 308/196 X
2,779,641  1/1957  Sutowski ............................. 308/196
4,252,386  2/1981  Hofmann et al. ................ 308/196 X

FOREIGN PATENT DOCUMENTS 363532  11/1922  Fed. Rep. of Germany ...... 308/196
2807411  8/1978  Fed. Rep. of Germany ... 308/184 R Primary Examiner—Stuart S. Levy
Assistant Examiner—Daniel P. Stodola

[57] ABSTRACT

A ball bearing set having a circumferential gap in each race, the outer radius of the outer race being decreased in the region of the gap in the outer race, and the inner radius of the inner race being increased in the region of the gap in the inner race.

11 Claims, 4 Drawing Figures

SPLIT RACE BEARING

BACKGROUND OF THE INVENTION

This invention pertains to a precision bearing structure wherein a ball bearing having a plurality of balls and two races supports a rotatable shaft on the inner race and a housing on its outer race.

Precision ball bearings, for example on the gimbals of stabilized platforms used in guidance systems, may be attached by adhesive to the surrounding housing and to the shaft. Unfortunately, fastening the races with adhesive prevents the removal of bearings.

If the bearing races are of a different material than the housing and shaft, the races have a different coefficient of thermal expansion than the housing and shaft.

For example, it may be desirable to fabricate the housing and shaft of aluminum and to fabricate the bearing races of steel. The aluminum has a higher thermal coefficient of expansion than the steel. When the temperature is decreased, the housing and shaft pulls away from the bearing races. When the temperature is increased, the housing and shaft tightens onto the steel bearing races and stresses the aluminum housing and shaft.

To avoid problems of differential thermal expansion while still attaching the steel races to the aluminum housing and shaft, radial cuts have been made through the races, and a small segment of the races is removed. The bearing races are axially loaded so that the steel races continually load the balls and are pushed into solid contact with both the aluminum housing and shaft. Differential thermal expansion between the aluminum and steel merely opens and closes the gap in the races and varies the load angle on the balls. The races are maintained at a tight fit with both the shaft and housing. However, because of the space left by the segment removal, the bearings are easily inserted into and removed from the housing, and the shaft is easily inserted into and removed from the inner race. Unfortunately, when the balls cross the gap left by the removed segments in the races, a short-duration torque is observed between the races.

To avoid the torque pulses between the races, ramps may be machined onto the ball track where the balls contact the gap. Although such ramps remove the torque pulses, when the gaps in both of the races are radially aligned, because of the large spacing between the races in the region of the gaps, the balls are unloaded. Further, such ramps are very difficult to machine.

BRIEF DESCRIPTION OF THE INVENTION

It is contemplated by this invention that a bearing with split bearing races wherein the segments are removed by radial cuts in each of the two bearing races shall be modified in a unique configuration to avoid torquing pulses when the balls cross the gaps produced by the cuts. The improvement of this invention reduces the thickness of both of the races adjacent the gaps in the races where the radial segments were removed. In the region of the gaps the outer radius of the outer race is reduced, and the inner radius of the inner race is increased. The reducing of the outer radius of the outer race produces a space between the outer race and the housing in the region of the gap in the outer race, and both ends of the split outer race become cantilevered springs. Similarly, the increasing of the inner radius of the inner race produces a space between the inner race and the shaft in the region of the gap in the inner race, and both ends of the split inner race become cantilevered springs. The cantilevered springs are flexed as the balls pass over the gaps, and no torque pulses are produced.

It is therefore the object of this invention to provide a new ball bearing structure.

Other objects will become apparent from the following description taken together with the accompanying drawings.

DETAILED DESCRIPTION OF THE INVENTION

Figure 1:
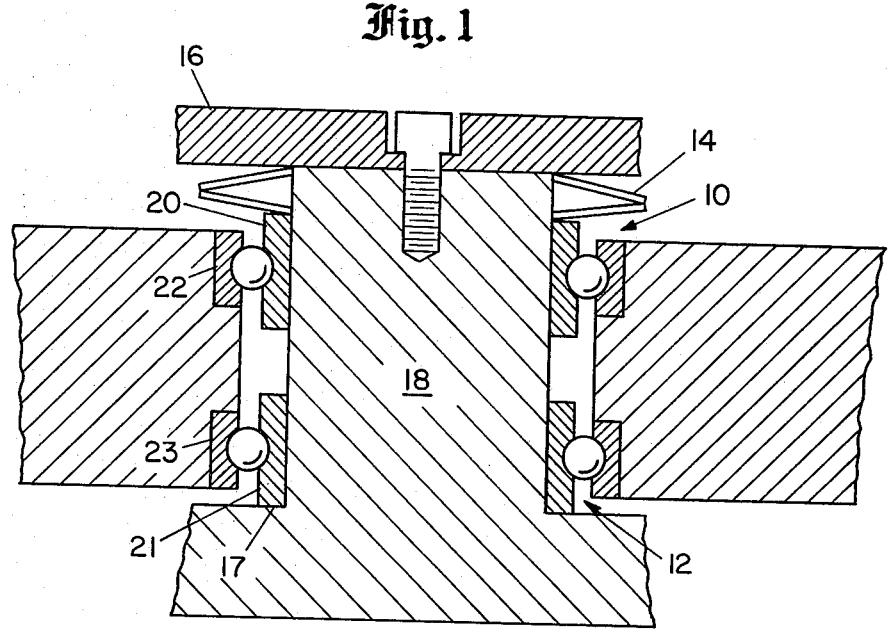
FIG. 1 shows a sectional view of a shaft mounted upon a pair of loaded ball bearing sets relative to a housing.

The ball bearing set of this invention is particularly useful in the embodiment of FIG. 1. FIG. 1 shows two loaded ball bearing sets 10 and 12. The ball bearing sets, for example, may be loaded by a Belleville spring 14 positioned between a flange 16 on the shaft 18 and the inner race 20 of the ball bearing set 10. The inner race 21 of the ball bearing set 12 engages shoulder 17 so that the spring 14 loads both sets 10 and 12. The outer races 22, 23 of ball bearing sets 10 and 12 are pressed into contact with housing 24.

Figure 2:
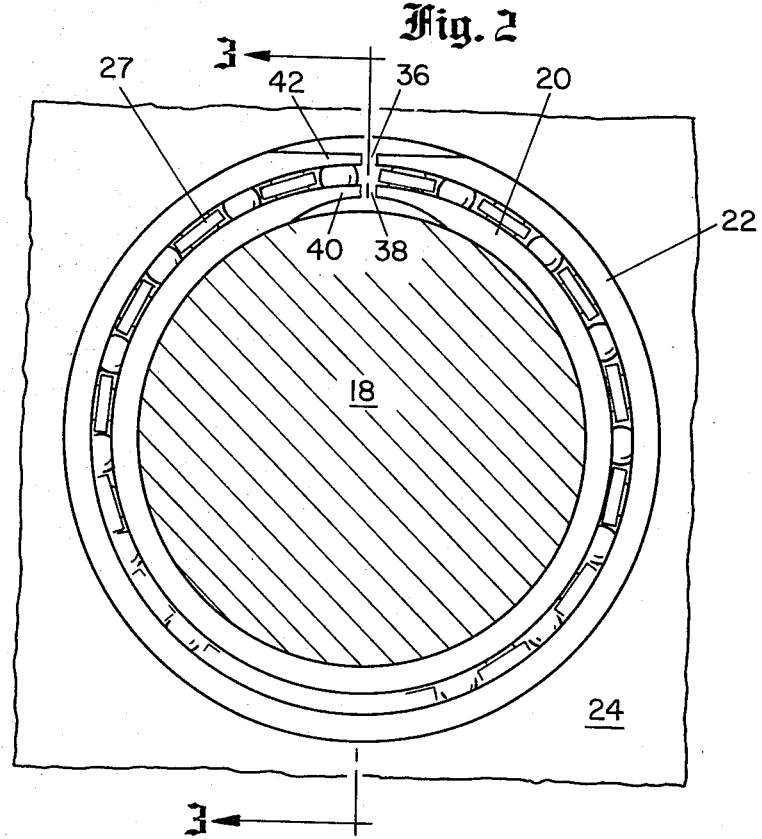
FIG. 2 shows a plan view of a ball bearing assembly according to this invention.
Figure 3:
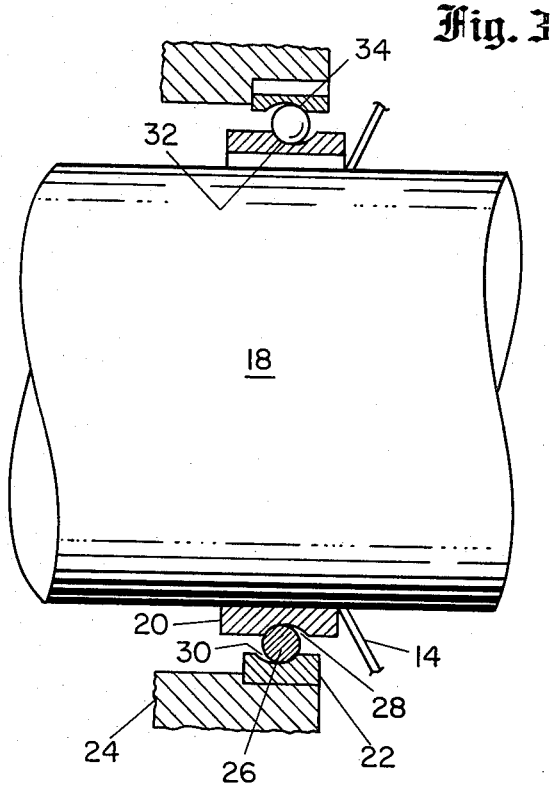
FIG. 3 is a view, partly in section, taken at 3—3 in FIG. 2.
Figure 4:
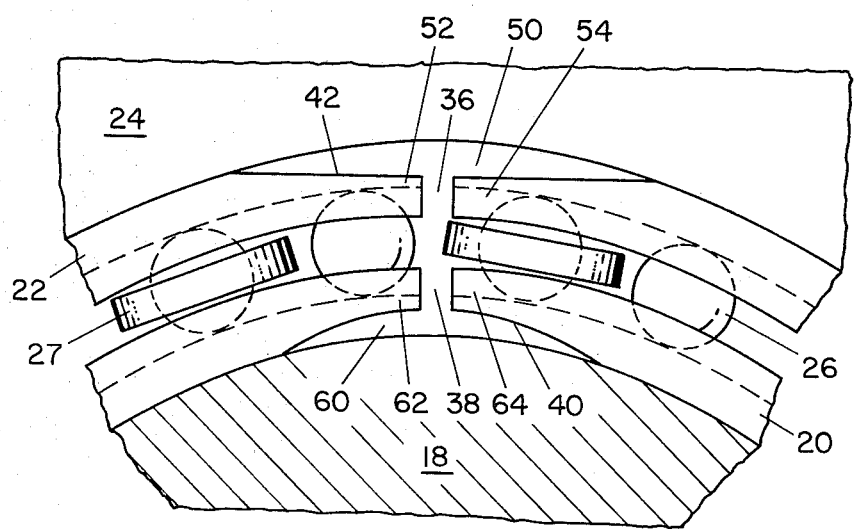
FIG. 4 is an enlarged view of FIG. 2 at the gaps in the ball races.

The ball bearing set of this invention is better shown in FIGS. 2 and 3 together with the enlarged portion of FIG. 4. Only the ball bearing set 10 is described, but the set 12 is identical to the set 10.

The ball bearing set 10 has an outer race 22 and an inner race 20 with a plurality of balls 26 therebetween. Alternate balls may support spacers 27 which may be of Teflon. The balls 26 are loaded so that the contact points between the balls 26 and the channels 28, 30 are staggered according to prior art shown, for example, at 32, 34 in exaggerated view in FIG. 3. Both shown inner race 20 and the outer race 22 are split and each has a segment removed therefrom to form gaps 36, 38. For convenience in the drawing, gaps 36, 38 are shown aligned in FIGS. 2 and 4, but they will usually not be aligned.

If the inner race 20 were not against the shaft 18, and if the outer race 22 were not against the housing 24, the inner race 20 could flex inwardly, and the outer race 22 could flex outwardly. However, with the shaft 18 and housing 24 in place, the races are solid against them and cannot flex.

To prevent the balls 26 from producing torque pulses between the races 20 and 22 as the balls 26 cross the gaps 36 and 38 and engage the gap edges of the races, it is comtemplated by this invention to increase the inner radius of the inner race 20 in the region of the gap 38, as shown at 40, and to reduce the outer radius of the outer race 22 in the region of the gap 36, as shown at 42. The inner radius of the inner race 20 may be increased conveniently by a rotary machine tool, and the outer radius of the outer race 22 may be decreased conveniently by forming a substantially planar surface substantially along a chord of a nonreduced outer diameter. The reduction of the outer radius of race 22 forms a space 50 between the race 22 and the housing 24 so that the opposing ends 52 and 54 of the race 22 are cantilevered springs. The increase of the inner radius of the race 20 forms a space 60 between the race 20 and the shaft 18 so that the opposing ends 62 and 64 of the race 20 are cantilevered springs. Note that the surface 42 is preferably substantially normal to gap 36 to cause springs 52 and 54 to be substantially identical. Note also that the substantially circularly cylindrical surface 40 preferably has a diameter which is less than the nonenlarged radius of the inner race 20. The axis of such cylindrical is preferably substantially parallel to the axis of the inner race 20, and it is preferably symmetrical with respect to the gap 38 to cause the springs 62 and 64 to be substantially identical. The alterations of the races 20, 22 may also be formed by an electrical forming tool.

As the balls 26 cross over the gap 36, the springs 52 and 54 flex outwardly to avoid producing a torque between the races 20 and 22. Similarly, as the balls 26 cross over the gap 38, the springs 62 and 64 flex outwardly to avoid producing a torque between the races 20 and 22.

It is noted that in the region of the gaps 36 and 38 and extending the partial circumference of the spaces 50 and 60, the load carrying capacity of the bearing is weakened. For that reason, the length of such partial circumferences should be minimized. Those circumferences, however, should be long enough to allow the springs 42, 54, 62 and 64 to flex sufficiently to avoid producing a torque between the races 20 and 22 as the balls 26 cross the gaps 36 and 38.

Typical dimensions are:
Ball diameter: ⅛ inch nominal;
Nonreduced diameter of outer race 22: 2.00 inch;
Nonenlarged diameter of inner race 20: 1.56 inch ;
Radius of Surface 40: ⅜ inch nominal;
Minimum thickness between the ball channel and the outer diameter of race 22, and the minimum thickness between the ball channel and the inner diameter of race 20: 0.010 inch;
Nominal nonreduced thickness of races 20 and 22: 0.080 inch;
Circumferential width of gaps 36 and 38: 0.005 inch.

It must be stressed that the above dimensions are by way of example only, and they are intended to show a typical bearing set.

There has thus been disclosed herein a ball bearing set 10 wherein the bearing races 20 and 22 are firmly loaded against the shaft 18 and housing 24, but wherein the bearings may easily be removed after removing the loading. Such easy removal occurs because of the gaps 36 and 38. The undesirable phenomenon of such a bearing wherein the balls 26 create torque pulses between the bearing races 20 and 22 as the balls 26 cross the gaps 36 and 38 has been removed by providing cantilevered springs 52, 54, 62 and 64 which flex as the balls 26 cross the gaps 36 and 38.

Although the invention has been described in detail above, it is not intended that the invention shall be limited by that description alone but only together with the accompanying claims.

I claim:
1. A ball bearing combination comprising:
a ball bearing set having split inner and outer races with first and second circumferential segments removed, respectively, from said inner and outer races to form first and second gaps in said races, and a plurality of ball bearings between said races;
a shaft within said inner race;
a housing surrounding said outer race;
axial loading means on said bearing races to force said inner race into engagement with said shaft and said outer race into engagement with said housing;
the outer radius of said outer race being diminished in the region of said first gap in said outer race to form a first opening between said outer race and said housing to cause opposing ends of said outer race to become a first set of cantilevered springs;
the inner radius of said inner race being enlarged in the region of said second gap in said inner race to form a second opening between said inner race and said shaft to cause opposing ends of said inner race to become a second set of cantilevered springs;
said first and second sets of cantilevered springs being flexible to reduce torque pulses, delivered by said ball bearings as they cross said gaps.

2. A ball bearing combination according to claim 1 in which the outer radius of said outer race is diminished by forming a substantially flat surface thereon substantially along a chord of the nondiminished outer diameter of said outer race, said surface being substantially normal to said first gap in said outer race to cause the springs of said first set of cantilevered springs to be substantially identical.

3. A ball bearing combination according to claim 2 in which the inner radius of said inner race is enlarged by forming a substantially circularly cylindrical surface thereon whose diameter is less than the nonenlarged radius of said inner race, said cylindrical surface having an axis substantially parallel to the axis of said inner race and being symmetrical with respect to said second gap in said inner race to cause the springs of said second set of cantilevered springs to be substantially identical.

4. A ball bearing combination according to claim 1 in which the inner radius of said inner race is enlarged by forming a substantially circularly cylindrical surface thereon whose diameter is less than the nonenlarged radius of said inner race, said cylindrical surface having an axis substantially parallel to the axis of said inner race and being symmetrical with respect to said second gap in said inner race to cause the springs of said second set of cantilevered springs to be substantially identical.

5. In combination:
a ball bearing set having a split outer race with a segment removed therefrom to divide the circumference of said outer race to form a gap, an inner race, and a plurality of ball bearings positioned between said races to cross the gap produced by said removed segment;
the outer radius of said outer race being diminished across its full axial dimension in the region of said gap to form a first set of opposing cantilevered spring ends, whereby torque pulses, produced by said ball bearings as they cross said gap, are reduced.

6. The combination of claim 5 wherein said outer radius is diminished by forming a substantially flat surface thereon substantially along a chord of the nondiminished outer diameter of said outer race, said surface being substantially normal to said gap in said outer race.

7. The combination of claim 5 in which said inner race is split with a second segment removed therefrom to divide the circumference of said inner race to form a second gap, the inner radius of said inner race being enlarged across its full axial dimension to form a second set of opposing cantilevered spring ends of substantially identical opposing cantilevered spring ends of said inner face.

8. The combination of claim 7 in which the inner radius of said inner race is enlarged into the contour of a substantially circularly cylindrical surface whose diameter is less than the nonenlarged radius of said inner race, said cylindrical surface having an axis substantially parallel to the axis of said inner race and being symmetrical with respect to said second gap in said inner race.

9. The combination of claim 8 wherein the outer radius of said outer race is diminished into the contour of a substantially flat surface across its full axial dimension and substantially along a chord of the non-diminished outer diameter of said outer race, said surface being substantially normal to said gap in said outer race.

10. In combination:

a ball bearing set having a split inner race with a segment removed therefrom to divide the circumference of said inner race to form a gap, an outer race, and a plurality of ballbearings positioned between said races to cross the gap produced by said removed segment;

the inner radius of said inner race being enlarged across its full axial dimension in the region of said gap to form a set of opposing cantilevered spring ends, whereby torque pulses, produced by said ball bearings as they cross said gap, are reduced.

11. The combination of claim 10 in which said inner radius of said inner race is enlarged into the contour of a substantially circularly cylindrical surface whose diameter is less than the nonenlarged radius of said inner race, said cylindrical surface having an axis substantially parallel to the axis of said inner race and being symmetrical with respect to said second gap in said inner race.

* * * * *